US 8,256,583 B2

(12) United States Patent
Tebbe

(10) Patent No.: US 8,256,583 B2
(45) Date of Patent: Sep. 4, 2012

(54) INTEGRATED OUTBOARD WET DISK BRAKE

(75) Inventor: Scott A. Tebbe, Oconomowoc, WI (US)

(73) Assignee: Deere & Company, Moline, IL (US)

( * ) Notice: Subject to any disclaimer, the term of this patent is extended or adjusted under 35 U.S.C. 154(b) by 1007 days.

(21) Appl. No.: 11/737,775

(22) Filed: Apr. 20, 2007

(65) Prior Publication Data

US 2008/0257659 A1    Oct. 23, 2008

(51) Int. Cl.
*B60T 1/06* (2006.01)

(52) U.S. Cl. .................................. 188/18 A; 188/17

(58) Field of Classification Search .................. 188/17, 188/18 R, 18 A, 26; 280/124.11, 124.134, 280/124.138, 124.139, 124.141, 124.142, 280/124.146

See application file for complete search history.

(56) References Cited

U.S. PATENT DOCUMENTS

| 4,128,145 | A | * | 12/1978 | Euler ............................ 188/71.2 |
| RE34,151 | E | * | 12/1992 | Murakami et al. ..... 280/124.138 |
| 5,435,591 | A | * | 7/1995 | Lee .......................... 280/124.139 |
| 6,073,731 | A | * | 6/2000 | Ieda .............................. 188/71.5 |
| 6,090,006 | A | * | 7/2000 | Kingston ..................... 475/323 |
| 7,530,433 | B2 | * | 5/2009 | Kingston et al. ............. 188/71.5 |
| 2002/0111219 | A1 | * | 8/2002 | Kraine et al. ................. 464/133 |
| 2005/0146105 | A1 | * | 7/2005 | Soles et al. ................. 280/86.75 |

FOREIGN PATENT DOCUMENTS

| DE | 19611427 | 9/1996 |
| EP | 0402777 | 12/1990 |

* cited by examiner

*Primary Examiner* — Melanie Torres Williams

(57) ABSTRACT

A integrated outboard wet disk brake comprises a one-piece casting including a power plate, an upper portion and a lower portion. The power plate provides a backing surface for a sealed annular housing for brake cooling fluid, and having a central opening. The upper portion extends radially and axially from the power plate above the central opening, and is pivotably connected to a first component of an independent wheel suspension. The lower portion extends radially and axially from the power plate below the central opening, and is pivotably connected to a second component of the independent wheel suspension.

20 Claims, 4 Drawing Sheets

INTEGRATED OUTBOARD WET DISK BRAKE

FIELD OF THE INVENTION

This invention relates generally to brakes on utility vehicles that are used for off-road, recreational or agricultural work.

BACKGROUND OF THE INVENTION

Brakes on automotive vehicles convert kinetic energy of vehicle motion into friction and heat to slow or stop the vehicle. Dry disk brakes may be exposed to the atmosphere to dissipate the heat. As a result, dry disk brakes are subject to contamination from soil, water or other debris, especially on utility vehicles that are frequently driven off-road.

The problems of contamination and heat dissipation can be addressed by encasing the brakes and running them in a fluid bath of brake cooling fluid. However, wet disk brakes have the disadvantages of greater cost and higher weight of the brake enclosure. If the enclosed brake is mounted at the vehicle's wheels, the unsprung mass of the vehicle increases. This is undesirable because it is detrimental to vehicle ride and handling. Additionally, if the brake is mounted inboard, the halfshafts must be made stronger to handle the braking loads.

A wet disk brake is needed for a utility vehicle having reduced cost and lower weight of the brake enclosure. A wet disk brake is needed that minimizes or reduces any increase in the unsprung mass of a utility vehicle. A wet disk brake is needed that does not require strengthening the halfshafts.

SUMMARY OF THE INVENTION

An integrated outboard wet disk brake is provided for use with an off-road utility vehicle having independent wheel suspension. The integrated outboard wet disk brake is a one piece casting having upper and lower portions pivotably attached to a control arm or other independent wheel suspension component, and a power plate providing a backing surface for a sealed annular housing.

The integrated outboard wet disk brake provides a low cost assembly that uses fewer parts and fewer manufacturing tool requirements that non-integrated wet disk brake and support components. The integrated outboard wet disk brake minimizes or reduces any increase in the unsprung mass of a utility vehicle. The integrated outboard wet disk brake is cast as a monolithic structure in which the sealed annular housing can serve as part of the vehicle suspension. The unsprung mass of the vehicle is reduced by using the sealed annular housing to carry the suspension loads.

DESCRIPTION OF THE PREFERRED EMBODIMENT

Figure 1:
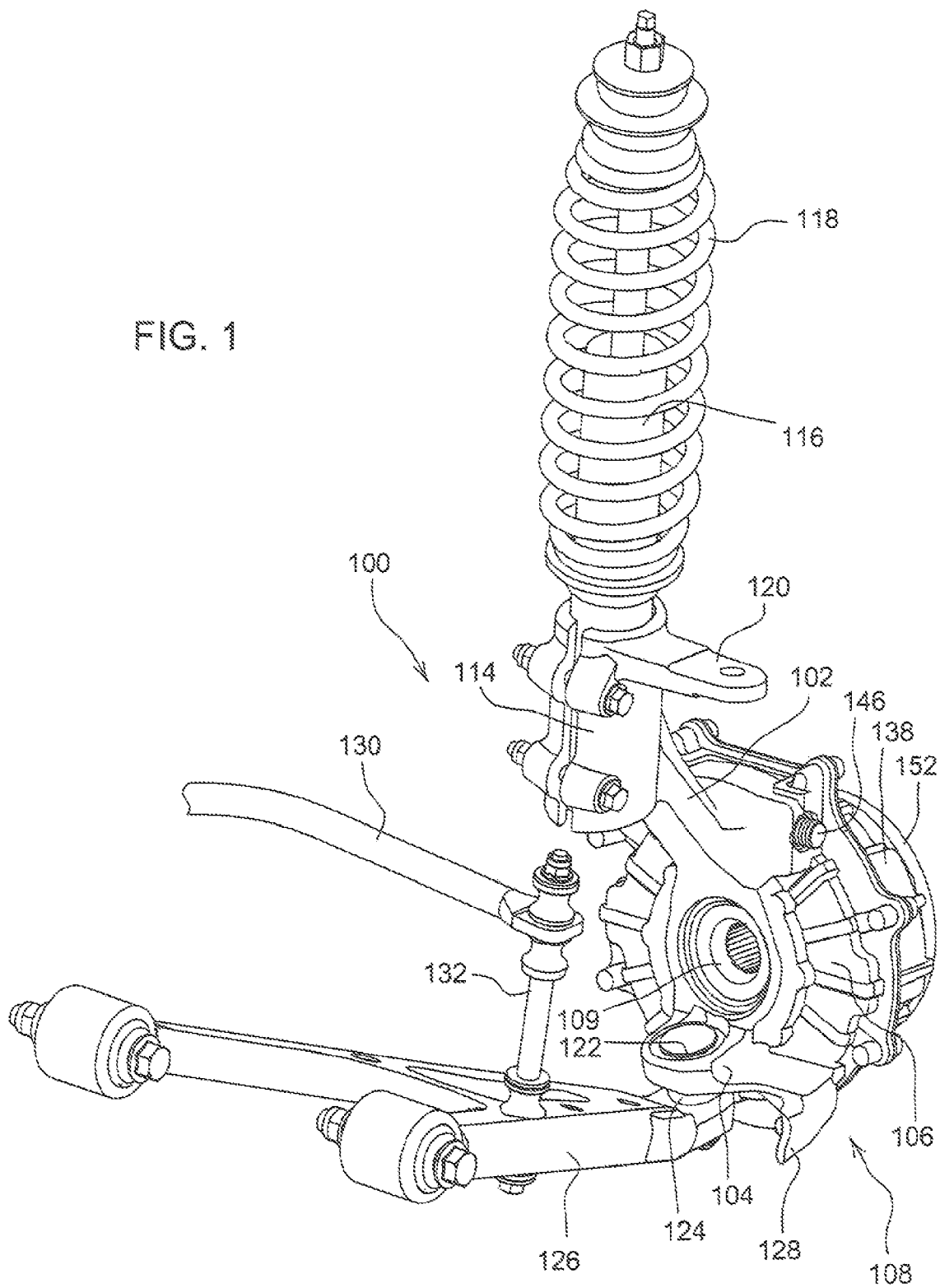
FIG. 1 is a perspective view of a front wheel suspension with an integrated outboard wet disk brake according to a first embodiment of the invention.
Figure 2:
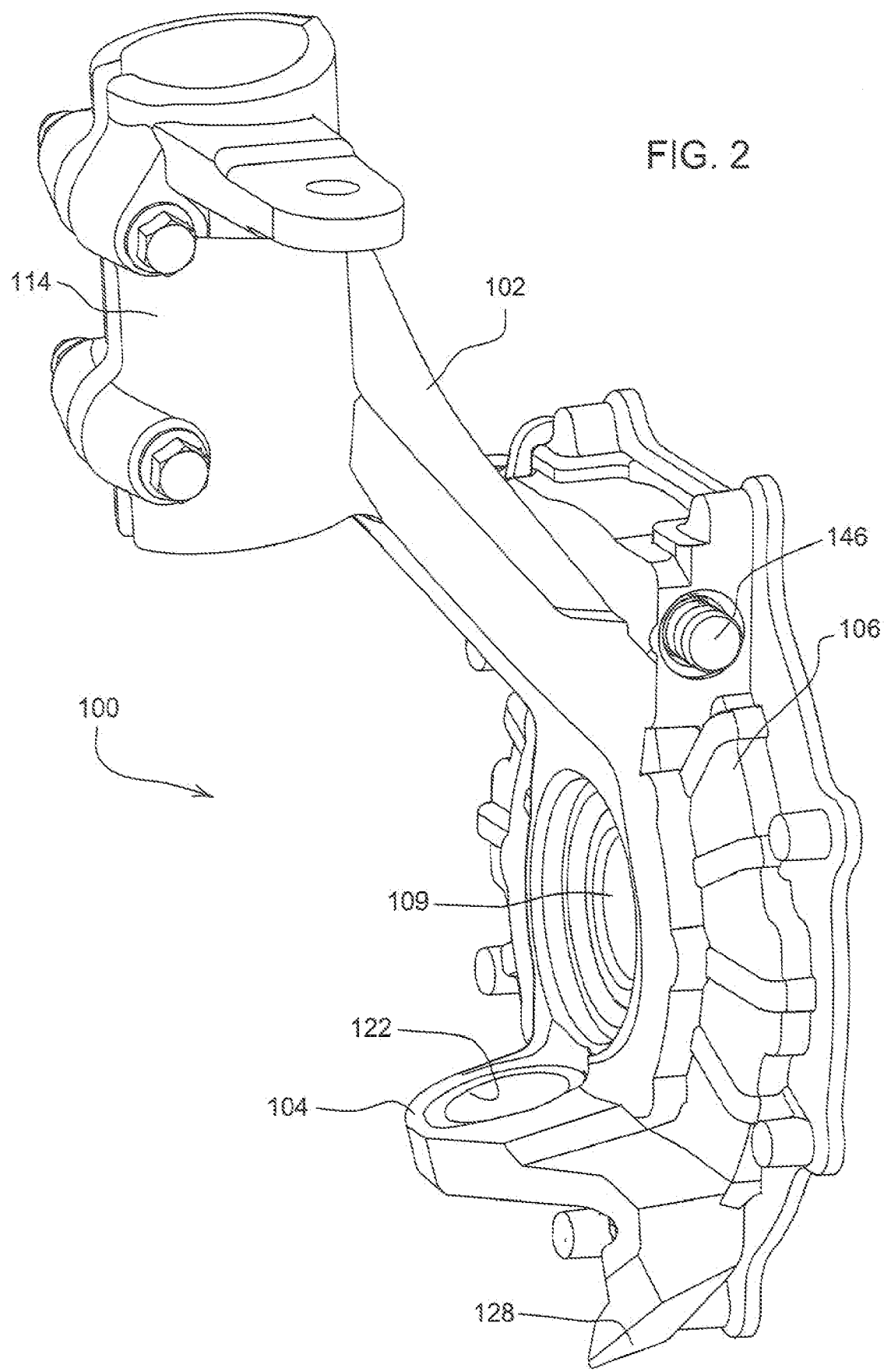
FIG. 2 is a perspective view of an integrated outboard wet disk brake according to a first embodiment of the invention.

In a first embodiment shown in FIGS. 1 and 2, integrated wet disk brake 100 is a one-piece, monolithic casting including upper and lower portions 102, 104 extending from power plate 106. The upper and lower portions of the integrated wet disk brake may be connected to a utility vehicle's independent front wheel suspension, and the power plate may be part of sealed annular housing 108. The upper and lower portions of the integrated wet disk brake provide the only support structure between the independent front wheel suspension and the front wheel of the vehicle.

In a first embodiment, the upper and lower portions 102, 104 of the integrated wet disk brake may be connected to the independent front wheel suspension components for a front wheel of a utility vehicle, which may be shock absorber 116, coil spring 118 and lower control arm 126. Upper portion 102 of the integrated wet disk brake extends radially and axially from power plate 106 above central opening 109 of sealed annular housing 108, which is the axis of rotation for a front axle half shaft and hub. Upper portion 102 may include sleeve 114 where the lower ends of shock absorber 116 and coil spring 118 may be mounted, and also may include joint 120 for pivotable attachment to a steering linkage (not shown).

In one embodiment, the lower portion of the integrated wet disk brake extends radially and axially from power plate 106 below central opening 109 of sealed annular housing 108, and below a front axle half shaft and hub. Lower portion 104 may include seat 122 where ball joint 124 may be mounted. The ball joint may be connected to the outer end of lower control arm 126. The inner end of the lower control arm may be pivotably mounted to the vehicle chassis. Lower portion 104 of the integrated wet disk brake also may include stop 128 which can abut the lower control arm to block turning beyond a maximum steering angle. Anti-sway bar 130 may be attached between the left and right control arms by links 132.

In a first embodiment, power plate 106 provides a backing surface for sealed annular housing 108 where stators and rotors may be alternately positioned in a chamber between the power plate and cover 138. The rotors may be splined to the inner diameter of the hub.

In a first embodiment, sealed annular housing 108 may enclose brake cooling fluid introduced through a fill plug in cover 138. The front disk brakes may be actuated by pressurized brake fluid into a brake hose connector through power plate 106. Internal passages or ducts in the power plate may direct brake fluid from the brake hose connector to an annular piston in sealed annular housing 108, which can move in response to the pressure to urge the stators and rotors into frictional contact. Bleed screw 146 may be provided in a bleed passage in the power plate to remove air from the system.

In a first embodiment, a front wheel may be mounted by threaded studs or other fasteners to flange 152. A hub 112 may be inserted through central opening 109 in the sealed annular housing, and engaged by splines to a half shaft. Annular seals may be provided between the hub or half shaft and cover 138, and/or between the hub or half shaft and power plate 106. Ball bearings also may be provided between the hub or half shaft and cover 138, and/or between the hub or half shaft and power plate 106.

Figure 3:
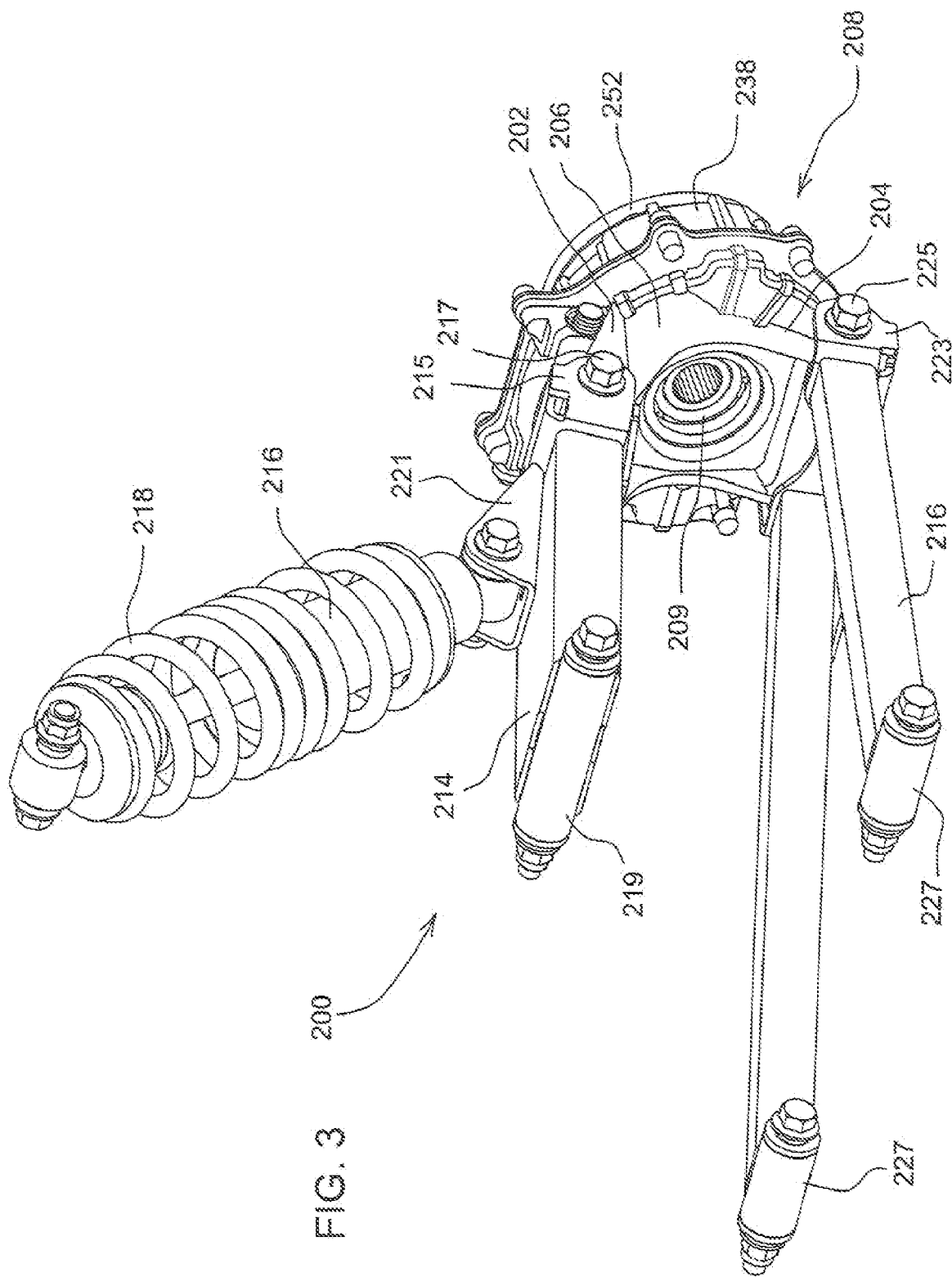
FIG. 3 is a perspective view of a rear wheel suspension with an integrated outboard wet disk brake according to a second embodiment of the invention.
Figure 4:
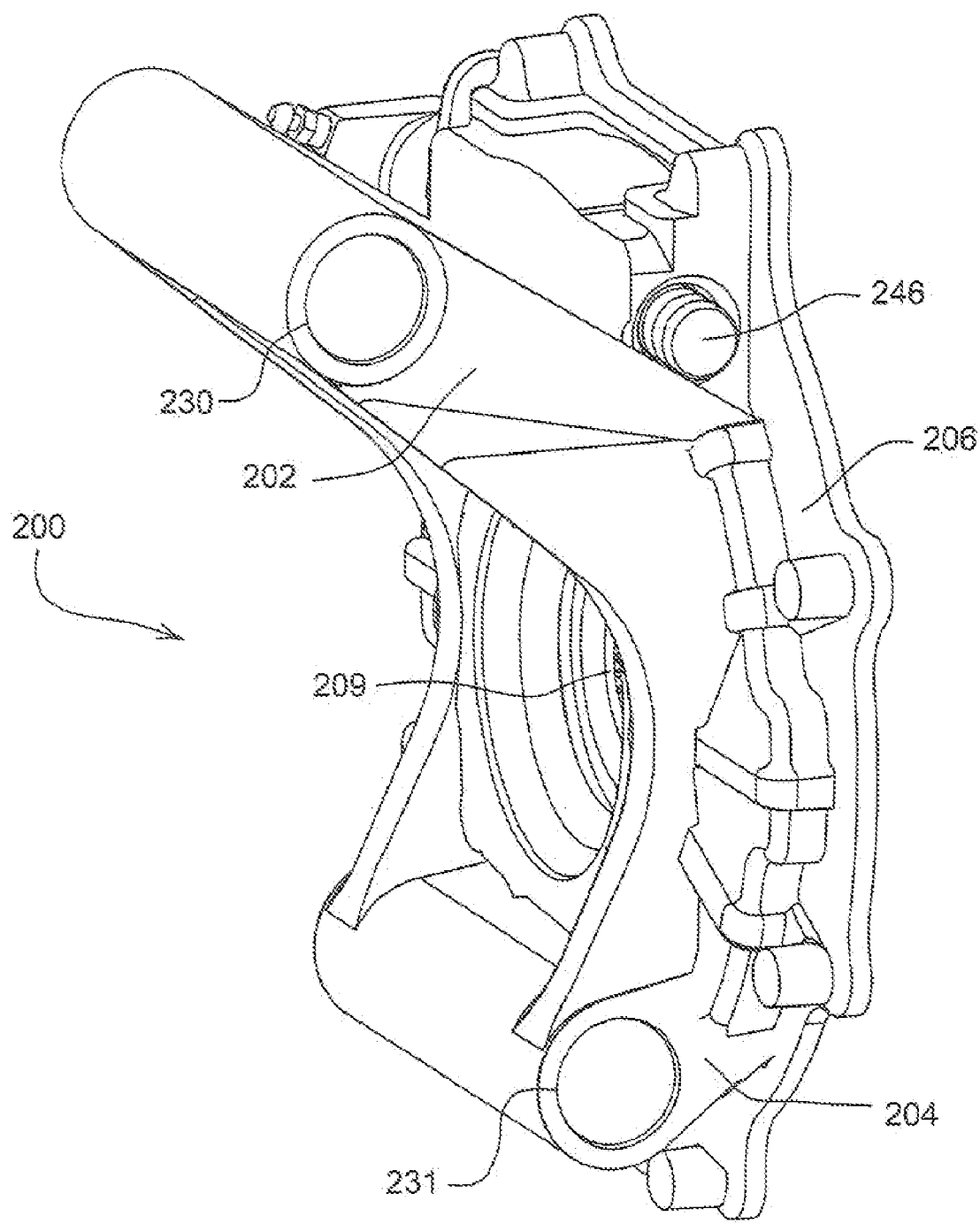
FIG. 4 is a perspective view of an integrated outboard wet disk brake according to a second embodiment of the invention.

In a second embodiment shown in FIGS. 3 and 4, integrated wet disk brake 200 is a one-piece casting including upper and lower portions 202, 204 extending from power plate 206. The upper and lower portions may be connected to a utility vehicle's independent rear wheel suspension, and power plate 206 may be a part of sealed annular housing 208. The upper and lower portions may provide the only support structure between the independent rear wheel suspension and a rear wheel of a vehicle.

In a second embodiment, upper and lower portions 202, 204 of the integrated wet disk brake may be pivotably connected to upper and lower control arms 214, 216 which may be the components of an independent rear wheel suspension for a rear wheel of a utility vehicle. Upper portion 202 of the integrated wet disk brake extends radially and axially from power plate 206 above central opening 209 in sealed annular housing 208, which is the axis of rotation for a rear axle shaft and hub. Outer end 215 of upper control arm 214 may be pivotably mounted to upper portion 202 by pivot connection 217 through sleeve 230 in the upper portion of the integrated wet disk brake. The inner end 219 of upper control arm 214 may be pivotably mounted to the vehicle chassis. Shock absorber 216 and coil spring 218 also may be mounted between bracket 221 on upper control arm 214 and the vehicle chassis.

In one embodiment, lower portion 204 of integrated wet disk brake 200 may extend radially and axially from power plate 206 below central opening 209 in sealed annular housing 208, below the rear axle half shaft and hub, and may be pivotably connected to the outer end of lower control arm 216. Outer end 223 of lower control arm 216 may be pivotably mounted to lower portion 204 by pivot connection 225 through sleeve 231 in the lower portion of the integrated wet disk brake. Inner ends 227 of lower control arm 216 may be pivotably mounted to the vehicle chassis.

In the second embodiment, power plate 206 provides a backing surface for sealed annular housing 208 where stators and rotors may be alternately positioned in a chamber between the power plate and cover 238. The rotors may be splined to the inner diameter of the hub.

In the second embodiment, sealed annular housing 208 may enclose brake cooling fluid introduced through a fill plug in cover 238. The rear disk brakes may be actuated by pressurized brake fluid into a brake hose connector in power plate 206. Internal passages or ducts in the power plate may direct brake fluid from the brake hose connector to an annular piston, which can move in response to the pressure to urge the stators and rotors into frictional contact. Bleeder screw 246 may be provided in a bleed passage in and through the power plate to remove air from the system.

In the second embodiment, a rear wheel may be mounted by threaded studs or other fasteners to flange 252. A hub may be inserted into central opening 209 in the sealed annular housing, and engaged by splines to a half shaft. Annular seals may be provided between the hub or half shaft and cover 238, and/or between the hub or half shaft and power plate 206. Ball bearings may be provided between the hub or half shaft and cover 238, and/or between the hub or half shaft and power plate 206.

Having described preferred embodiments, it will become apparent that various modifications can be made without departing from the scope of the invention as defined in the accompanying claims.

The invention claimed is:

1. An integrated outboard wet disk brake, comprising:
    a one-piece casting including a power plate, an upper portion and a lower portion;
    a cover attached to the power plate to form a sealed annular housing encasing brake members bathed in brake cooling fluid and having a central opening;
    the upper portion extending radially and axially from the power plate above the central opening, and pivotably connected to a first component of an independent wheel suspension;
    the lower portion extending radially and axially from the power plate below the central opening, and pivotably connected to a second component of the independent wheel suspension; and
    a splined connection engageable through the central opening.

2. The integrated outboard wet disk brake of claim 1 wherein the upper portion includes a sleeve where a first component of the independent wheel suspension is mounted.

3. The integrated outboard wet disk brake of claim 1 wherein the upper portion is pivotably connected to a shock absorber and a coil spring.

4. The integrated outboard wet disk brake of claim 1 wherein the upper portion further includes a joint pivotably connected to a steering linkage.

5. The integrated outboard wet disk brake of claim 1 wherein the upper portion is pivotably connected to an outer end of a control arm.

6. The integrated outboard wet disk brake of claim 1 wherein the lower portion is pivotably connected to an outer end of a control arm.

7. An integrated outboard wet disk brake, comprising:
    a monolithic structure including a power plate, and upper and lower portions extending from the power plate;
    a cover attached to the power plate to form a sealed annular housing encasing brake members in brake fluid;
    a splined connection engageable through an opening in the sealed annular housing;
    the upper and lower portions providing the only support structure between an independent wheel suspension and a wheel.

8. The integrated outboard wet disk brake of claim 7 wherein the independent wheel suspension includes a pivotable control arm.

9. The integrated outboard wet disk brake for claim 7 wherein the independent wheel suspension includes a shock absorber and a coil spring.

10. The integrated outboard wet disk brake of claim 9 wherein the upper portion includes a sleeve where the shock absorber and coil spring are mounted.

11. The integrated outboard wet disk brake of claim 7 wherein the upper portion and lower portion each extend radially and axially from the power plate.

12. An integrated outboard wet disk brake, comprising:
    an independent wheel suspension including a control arm having an inner end pivotably attached to a vehicle frame and an outer end;
    a one piece casting having:
        a lower portion pivotably attached to the outer end of the control arm;
        a power plate providing a backing surface for a sealed annular housing encasing brake members in brake fluid;
        a central opening providing access to a splined connection; and
        an upper portion connected to the independent wheel suspension.

13. The integrated outboard wet disk brake of claim 12 wherein the upper portion is connected to a shock absorber and coil spring.

14. The integrated outboard wet disk brake of claim 12 wherein the upper portion is connected to an outer end of a second control arm.

15. The integrated outboard wet disk brake of claim 12 wherein the sealed annular housing further comprises a cover attached to the power plate.

16. The integrated outboard wet disk brake of claim 12 further comprising a central opening in the sealed annular housing.

17. The integrated outboard wet disk brake of claim 16 wherein the upper portion is above the central opening, and the lower portion is below the central opening.

18. The integrated outboard wet disk brake of claim 12 further comprising a ball joint connecting the lower portion to the outer end of the control arm.

19. The integrated outboard wet disk brake of claim 12 wherein the upper portion includes a joint for pivotable attachment to a steering linkage.

20. The integrated outboard wet disk brake of claim 19 wherein the lower portion includes a stop which can abut the control arm to block turning beyond a maximum steering angle.

* * * * *